April 22, 1941.　　　F. H. ROBY　　　2,239,053
WELDER CONTROL SYSTEM
Filed Sept. 28, 1939　　　2 Sheets-Sheet 1
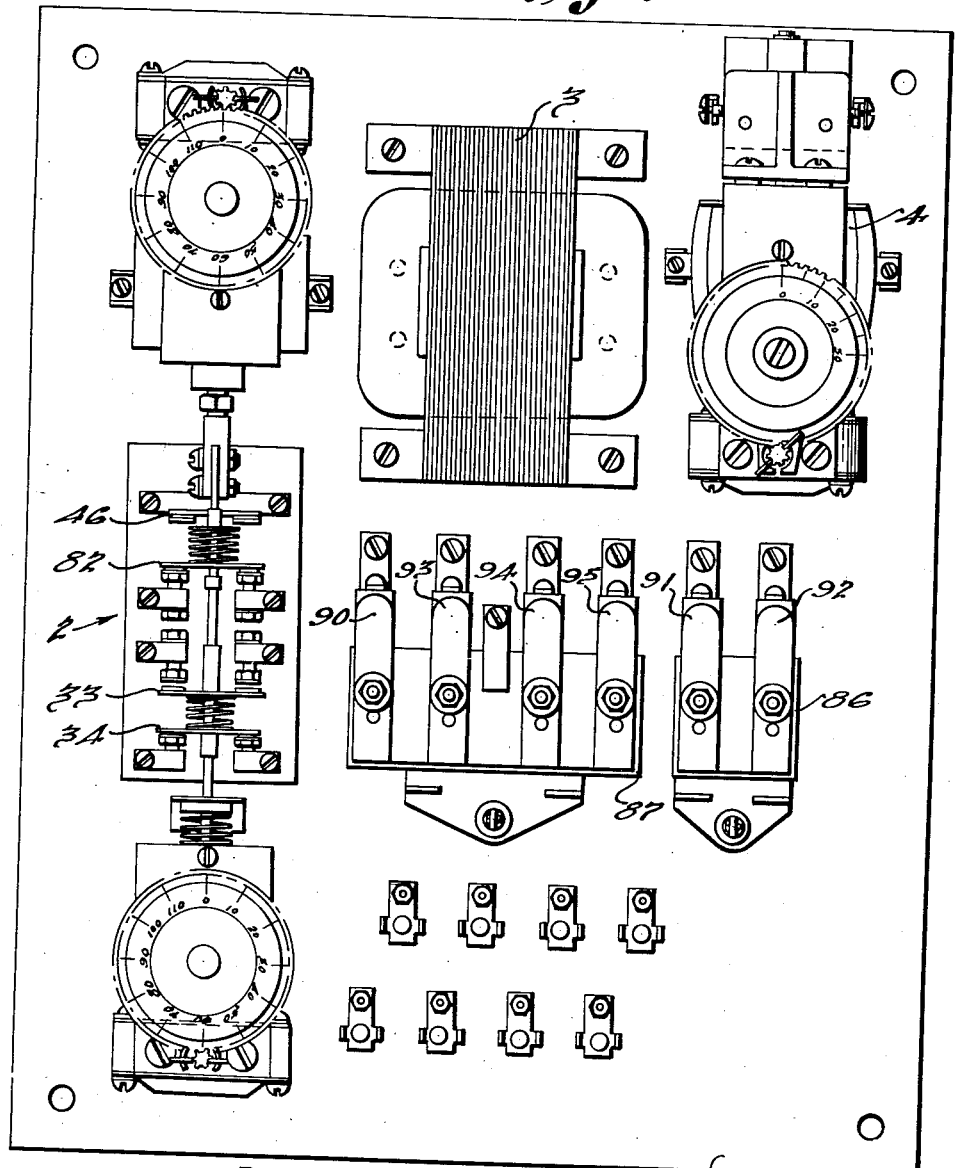
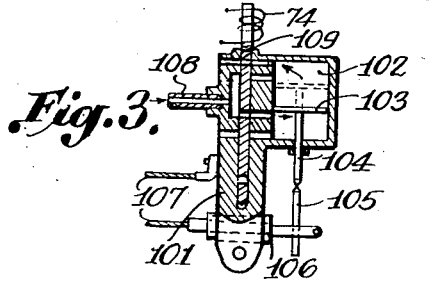
INVENTOR
Frank H. Roby.
BY Myron J. Seibold
ATTORNEY Patented Apr. 22, 1941

2,239,053

UNITED STATES PATENT OFFICE 2,239,053

WELDER CONTROL SYSTEM

Frank H. Roby, Milwaukee, Wis., assignor to Square D Company, Detroit, Mich., a corporation of Michigan Application September 28, 1939, Serial No. 296,879

7 Claims. (Cl. 219—4)

This invention relates to a control system for electric welding and has for its object a control system for electric spot welding in which the electrodes are applied to the work by fluid pressure in which the timing period between the initiation of fluid flow to the electrodes and the application of current through the work between the electrodes is controlled to apply a longer period in the case of single welds and in the case of the first of a series of welds, than is applied in the case of succeeding welds in a continuous series of welds.

This invention constitutes an improvement over the invention described and claimed in my Patent No. 2,124,795 granted July 26, 1938, for Welder control system. In this patent there is disclosed and claimed a welder control system for a single weld or a series of welds in which there is provided a time delay between the application of fluid pressure and the energization of the electrodes and in which there are, in addition, other periods in the welding cycle also time controlled. A complete welding cycle in electric spot welding utilizing fluid pressure controlled electrodes is ordinarily made up of three or four periods. There is, first, the "squeeze" period which is a time interval between the initiation of electrode pressure and the actual energization of the electrodes. Secondly, there is a "weld" period in which the current passes through the work. The third period is ordinarily a "hold" period in which the electrodes are deenergized, but pressure is maintained upon the work; and, a fourth or "off" period in which the electrode pressure is released. The hold period may be omitted in some systems where very high speed operation is desirable on light gauge metal and where reliance can be placed on the normally sluggish operation of the air pressure cylinder to secure some small inherent holding time. In the operation of such welding systems, it is, of course, desired to have the squeeze period, which is simply a delay to permit the proper pressure to be obtained on the work, made as short as possible in order to secure a greater speed of welding. It has been found that in starting up a pneumatic tool from rest, a long period is required to establish the proper electrode pressure due to the necessity of working against a static oil film and other factors which tend to slow up the first operation; therefore, in the case of single welds and also in the case of the first weld in a series of welds, a greater delay between the initiation of electrode pressure and the energizing of the electrode is required than is necessary for the succeeding welds in a series. It is the object of this invention to provide a system in which there is provided a short squeeze time sufficiently long to provide the desired delay when the welding tool is in operation and to provide an additional delay time serving to make this squeeze time greater in the case of single welds and in the case of the initial weld in a series.

Other objects and features of the invention will be readily apparent to those skilled in the art from the specification and appended drawings illustrating certain preferred embodiments in which:

Figure 1 is a front elevational view of a control panel for an electric welding system according to the present invention.

Figure 3 is a generally diagrammatic view showing the operating parts of a welder machine to which the system of the present invention may be applied.

Figure 2:
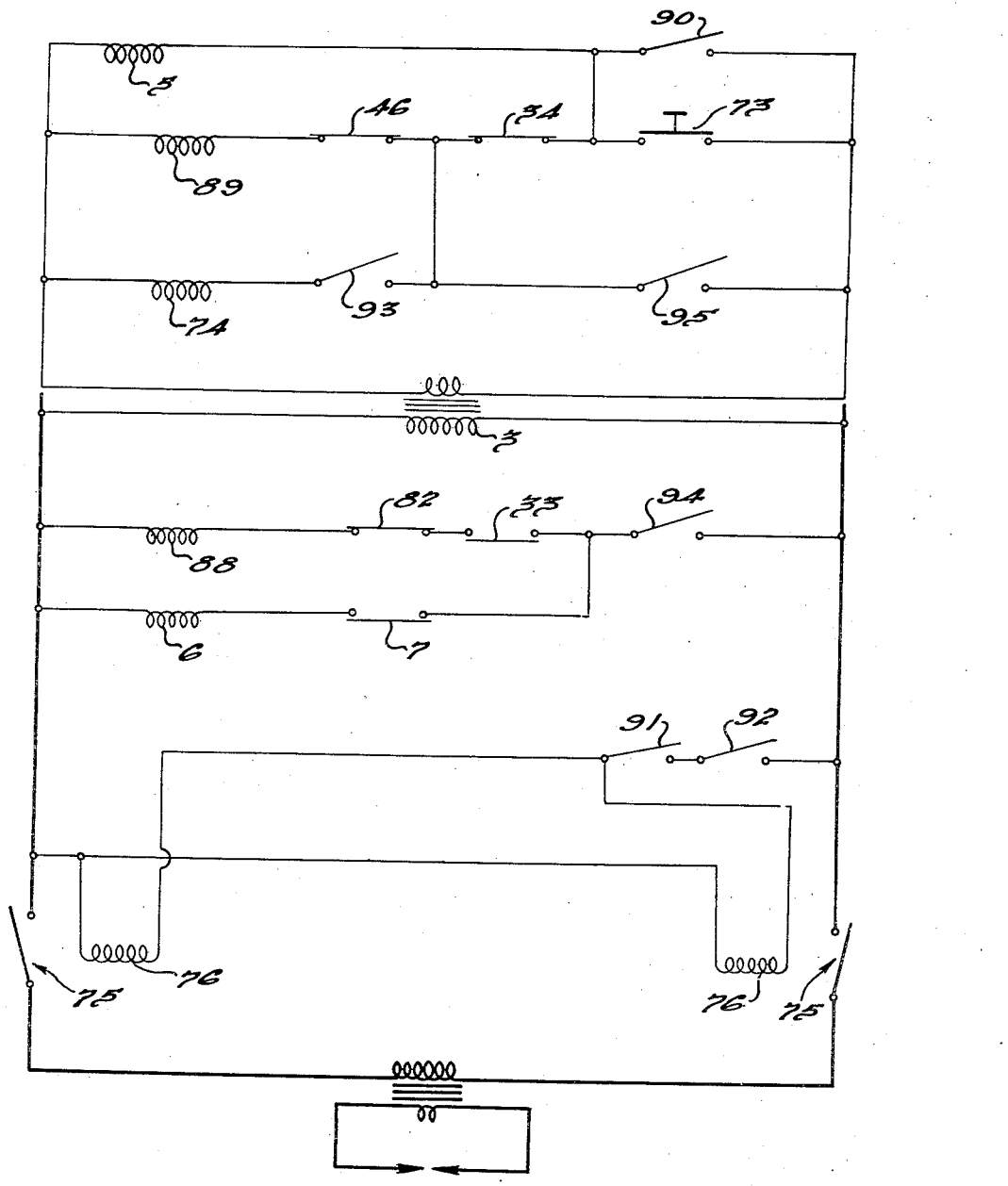
Figure 2 is a simplified wiring diagram of the system.

The control panel, according to the present invention, is similar to that shown in Figure 6 in my Patent No. 2,124,795, Figure 6 being a partial figure showing only the changed elements of the panel of Figure 1 of that patent.

In the control panel of this invention, there is mounted upon the plate 1 a timing relay 2 which corresponds to the timing relay 2 of my aforesaid patent but with the contact arrangement as in Figure 6 with the cooperating contact sets 46, 82, 33 and 34. There is also provided on the panel a step-down transformer 3 which is the same as that shown at 3 in the patent and there are control relays 86 and 87 corresponding to relays 86 and 87 of Figure 6 of the patent, but with relay 87 having an additional pair of cooperating contacts 90 in addition to its contacts 93, 94 and 95. The relay 86 has two pairs of cooperating contacts, 91 and 92. The control panel is further equipped with a time delay relay 4 whose construction is identical with that of the relay described and claimed in the patent of H. A. Wilhelm No. 2,158,346, granted May 16, 1939, except that the contacts are of the normally open type rather than the normally closed type shown in that patent.

The control system of this invention is to be applied to an electric welding tool having pneumatically operated welding electrodes, a schematic diagram of which is shown in Figure 3. This tool comprises a frame 101 which supports a cylinder 102 in which is disposed a piston 103 connected to a movable electrode 104. A cooperating electrode 105 is mounted on the lower part of the frame and insulated therefrom by an insulating sleeve 106. Leads 107 are connected to the secondary of the welding transformer to energize the electrodes 104 and 105. A fluid pressure inlet 108 is indicated for connection to any suitable source of fluid pressure, preferably compressed air, which is used to actuate the piston 103 within the cylinder 102. The valve is shown in the frame 101 and includes a movable valve portion 109 adapted to be moved by the solenoid coil 74. The position of the parts illustrated in Figure 3 is at the conclusion of a hold time in which the coil 74 has just been deenergized thereby allowing the valve portion 109 to move downwardly and connect the inlet port on the under side of the piston 103 with the source of fluid pressure. The force is now exerted tending to move the upper electrode to separated position into the dotted line position of the piston as shown.

To move the electrode to apply pressure to the work the coil 74 is energized moving the valve portion 109 upwardly and connecting the port on the upward side of the piston with the source of fluid pressure, thus moving the electrode downwardly into engagement with the work. The structure illustrated in Figure 3 is entirely conventional and is shown herein simply to illustrate one type of welding machine to which the system of applicant's invention is applicable. The control system of this invention includes, in addition to the elements shown on the control panel, a push button 73 of conventional form, electromagnetic contactors 75 having operating coils 76, and the solenoid valve operating coil 74 for controlling the flow of air to the electrode operating cylinder. Additional elements in the system incorporated in the elements of the control panel are the operating coil 6 for the timer 2, the operating coil 88 for the control relay 86, the operating coil 89 for control relay 87, the operating coil 5 of time delay relay 4, and the cooperating contacts 7 of the time delay relay 4.

In the operation of the welder control system, according to this invention, closing of the push button 73 to initiate the welding operation energizes the operating coil 89 of relay 87 which closes to effect closing of the contacts 90, 93, 94 and 95. Closing of contact 93 energizes the solenoid valve 74 and initiates passage of air to the cylinder of the welding tool. Closing of contact 95 forms a maintaining circuit for coil 89 and provides a non-beat characteristic to the system since opening of the push button 73 after closing of the contact 95 will have no effect upon the completion of a full welding cycle. The closing of contact 94 sets up the circuit for the operating coils 88 and 6 for the control relay 86 and the timer 2 respectively, but these operating coils are not energized until later in the sequence of operation. The closing of the push button also energizes the operating coil 5 of the time delay relay 4 and the closing of contact 90 forms an additional holding circuit around the push button for the operating coil 5 so as to avoid premature drop out of the time delay relay 4 when the push button is released.

After an interval of time determined by the setting of the time delay relay 4, its contacts 7 close to energize operating coil 6 of the timer 2 which initiates the timed upward movement of the operating rod of the timer. In this movement, the first operation is the opening of the contacts 34 to disconnect the push button from the operating coil 89 of relay 87 which, however, remains energized through contact 95. Thereafter, contact 33 is closed to energize the operating coil 88 of the control relay 86 which closes, effecting the closing of contacts 91, 92, which, in turn, effects the energization of the operating coils 76 of the electromagnetic contactors 75 which close to energize the primary of the welding transformer and initiates the flow of welding current through the material to be welded. In its continued upward movement, the operating rod of timer 2 next opens contact 82 which deenergizes the operating coil 88 effecting drop out of the control relay 86 and opening of the contacts 91, 92 and this, in turn, deenergizes the operating coils 76 of contactors 75 to terminate the flow of welding current. In its continued upward movement, the operating rod of the timer eventually effects opening of contact 46 which deenergizes the operating coil 89 of relay 87 effecting the opening of contacts 90, 93, 94, 95, whereupon the solenoid valve operating coil 74 is deenergized to relieve pressure on the electrodes and the operating coil 6 of the timer 2 is deenergized to effect the downward movement of the operating rod of the timer. In this downward movement, there is effected sequentially the closing of contact 46, the closing of contact 82, the opening of contact 33, and the closing of contact 34. Upon the closing of contact 34, the system is in position for a repetition of the welding cycle.

If the push button 73 is maintained closed, it is clear that upon the reclosing of contact 34 the welding cycle will be immediately repeated and will thus automatically continue so long as the push button remains closed. It is to be noted that with the push button thus maintained closed, the operating coil 5 of the time delay relay 4 is not deenergized so that the delay period added to the squeeze time by the time delay relay in the first weld of the series will not be included in or added to the squeeze time in the succeeding weld of any one series.

On the other hand, when the push button is released, the opening of contact 90 will effect deenergization of the operating coil 5 so that the delay relay will drop out to open its contact 7, and, upon the initiation of another weld cycle, the delay time will then be added to the squeeze time before the electrodes are energized.

In the control system as herein disclosed, it is seen that for normal repeat welding operation there are provided four timing periods, the first, or squeeze time, being that elapsed between energization of the operating coil 6 of timer 2 and of closing the contact 33 during which time the pressure of the electrode upon the material to be welded is built up since the solenoid valve operating coil 74 is in the repeat welds energized at the same time as the operating coil 6 of the timer. The second timing period, or weld time, occurs during the upward movement of the operating rod of the timer between the closing of contact 33 and opening of contact 82, during which time the weld electrodes are energized and currents passed through the weld. The third period is the hold time, which occurs during the upward movement of the operating rod of the timer between opening of the contact 82 and opening of contact 46, during which time the electrode pressure is maintained but the flow of current disconnected. The fourth timing period, or off time, is the time of downward movement of the operating rod of the timer to reestablish the system for the initiation of another weld.

According to the present invention, to the above times there is added a fifth or additional delay time which is interposed between the opening of the solenoid valve to initiate the flow of fluid pressure to the electrode operating cylinder and the energization of the electrodes to pass current through the work which is thus added to the ordinary squeeze time in the welding cycle, and, that this additional delay time is so added only for the initial weld of a series or in the case of individual welds and that there is thus provided a period between initiation of electrode pressure and actual energization thereof which is longer in the case of single welds, or the first in a series of welds in order to provide for the establishment of the proper electrode pressure for such welds, while at the same time there is provided only the requisite squeeze time for proper operation in the shorter periods required to establish the proper electrode pressure in the succeeding welds of a series.

It is, of course, understood, that, as explained in my Patent No. 2,124,795, in some instances the hold period may be omitted and that this in no way affects the inventive concept of the system herein disclosed, since it is an optional arrangement depending upon the type of material to be welded.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a welder control system for electrically welding work by passing current therethrough between electrodes pressed against the work by fluid pressure, means for initiating the application of fluid pressure, means for energizing the electrodes to pass current through the work, and means establishing a delay period between the initiation of electrode pressure and their energization, said means operating to establish a period of predetermined value in single welds and in the first of a continuous series of welds and a period of lesser predetermined value in the case of succeeding welds in a continuous series.

2. In a welder control system for electrically welding work by passing current therethrough between electrodes pressed against the work by fluid pressure, an electromagnetically operated valve controlling the application of fluid pressure, means controlling the passage of current through the work, means establishing a predetermined delay period between the opening of the valve and the passing of current, including means for establishing a period of greater length in single welds and in the first of a continuous series of welds than in the case of succeeding welds in a continuous series.

3. In a welder control system for electrically welding work by passing current therethrough between electrodes pressed thereagainst, means for establishing the electrode pressure, means for passing current through the work, means for effecting the operation of said pressure establishing means and current passing means in a predetermined cycle including means for effecting a continuous series of cycles to produce a series of welds and means for establishing a predetermined time delay period between the initiation of electrode pressure and the passing of current through the work, which period has a predetermined value in the first welding cycle of sufficient value to permit the building up of adequate electrode pressure in the welding tool starting from rest and a lesser predetermined value in welding cycles succeeding the first in a continuous series of sufficient value to permit the building up of adequate electrode pressure in the tool while operating.

4. In a welder control system for electrically welding work by passing current therethrough between electrodes pressed against the work by fluid pressure, means initiating the application of fluid pressure, time delay means for effecting the energization of the electrodes to pass current through the work a predetermined time interval after the initiation of the electrode pressure, and additional time delay means operable only in the case of single welds and in the first weld of a continuous series of welds for increasing said predetermined time interval.

5. In a welder control system for electrically welding work by passing current therethrough between electrodes pressed against the work by fluid pressure, means controlling the application of fluid pressure to said electrodes, means for energizing and deenergizing said electrodes to control the passage of current through the work, time delay means operating to provide a predetermined cycle for the operation of said means and including a squeeze period for initiation of fluid pressure before the energization of the electrodes, a welding period during which current flows, a hold period during which the electrodes are deenergized but the fluid pressure maintained, and an off period during which the fluid pressure is released and the electrodes deenergized, means for effecting a continuous series of cycles to produce a series of welds, and means for increasing the duration of the squeeze period in the first welding cycle, said time delay means determining said period intervals independent of variations in the current and fluid pressure supplied to the system.

6. In a welder control system for electrically welding work by passing current therethrough between electrodes pressed against the work by fluid pressure, an electromagnetically operated valve controlling the application of fluid pressure to the electrodes, electromagnetically operated contactors controlling the passage of current through the work, means effecting energization and deenergization of said valve and contactors in a predetermined cycle wherein the valve operates to initiate the application of fluid pressure, the contactors initiate the passage of current a predetermined time interval after the initiation of the fluid pressure, the contactors interrupt the current after a second predetermined time interval and the valve releases the fluid pressure after a third predetermined time interval and in which the valve and contactors remain deenergized for a fourth predetermined time interval in a series of continuous cycles effecting a series of welds, time delay means controlling said last mentioned means and determining said timing intervals independent of variations in the current and fluid pressure side of the system, and including means for determining a time interval between the operation of the valve and of the contactors which is greater in the case of the first welding cycle than in the welding cycle succeeding the first of a continuous series.

7. In a welder control system for electrically welding work by passing current therethrough between electrodes pressed against the work by fluid pressure, an electromagnetically operated valve controlling the application of fluid pressure to the electrodes, electromagnetically operated contactors controlling the passage of current through the work, a control relay, a time delay relay, means energizing said control relay, means energizing said electromagnetically operated valve when said control relay is energized, means at least preparing the circuit for said time delay relay when said control relay is energized, an additional set of contacts in the energizing circuit of said time delay relay which are under the control of a second time delay relay, means energizing said second time delay relay when said control relay is energized, whereby said first time delay relay will be energized a predetermined time interval after energization of the control relay, said first time delay relay energizing said electromagnetic contactors a predetermined number of times after its own energization, and means for effecting a continuous series of welding cycles including means for maintaining said second time delay relay energized whereby its delay period will be effective only in the first cycle of a continuous series.

FRANK H. ROBY.